United States Patent
Gupta

(10) Patent No.: US 6,459,364 B2
(45) Date of Patent: *Oct. 1, 2002

(54) INTERNET BROWSER FACILITY AND METHOD FOR THE VISUALLY IMPAIRED

(75) Inventor: Aloke Gupta, Corvallis, OR (US)

(73) Assignee: Hewlett-Packard Company, Palo-Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/577,307

(22) Filed: May 23, 2000

(51) Int. Cl.$^7$ .................................................. H04B 3/36
(52) U.S. Cl. ............................... 340/407.1; 340/407.2; 340/825.19; 434/113
(58) Field of Search .......................... 340/407.1, 407.2, 340/825.19, 965; 434/112, 113, 114; 382/114; 341/22, 23

(56) References Cited

U.S. PATENT DOCUMENTS

| | | | |
|---|---|---|---|
| 3,594,787 A | 7/1971 | Iekes | 340/407 |
| 4,018,603 A | 4/1977 | Sheridon et al. | 96/1.5 |
| 4,021,236 A | 5/1977 | Sheridon et al. | 96/1.5 |
| 4,023,969 A | 5/1977 | Sheridon | 96/1.5 |
| 4,044,350 A | 8/1977 | Tretiakoff et al. | 340/407 |
| 4,126,854 A | 11/1978 | Sheridon | 340/373 |
| 4,182,553 A | 1/1980 | Sheridon | 350/336 |
| 4,266,936 A | 5/1981 | Rose et al. | 434/114 |
| 4,305,067 A | 12/1981 | Tretiakoff et al. | 340/407 |
| 4,500,293 A | * 2/1985 | Eltgen | 434/114 |
| 4,586,904 A | * 5/1986 | Chlumsky | 434/114 |
| 4,871,992 A | 10/1989 | Petersen | 340/407 |
| 5,222,895 A | 6/1993 | Fricke | 434/113 |
| 5,244,288 A | * 9/1993 | Nagaoka et al. | 400/122 |
| 5,389,945 A | 2/1995 | Sheridon | 345/85 |
| 5,466,154 A | * 11/1995 | Thompson | 434/114 |
| 5,496,174 A | 3/1996 | Garner | 434/114 |
| 5,557,269 A | * 9/1996 | Montane | 341/22 |
| 5,580,251 A | * 12/1996 | Gilkes et al. | 434/113 |
| 5,636,038 A | * 6/1997 | Lynt et al. | 358/471 |
| 5,685,721 A | 11/1997 | Decker | 434/114 |
| 5,942,970 A | * 8/1999 | Norman | 340/407.1 |
| 6,059,575 A | * 5/2000 | Murphy | 434/112 |
| 6,128,671 A | * 10/2000 | Weijand | 710/5 |

* cited by examiner

Primary Examiner—Daniel J. Wu
Assistant Examiner—Toan Pham

(57) ABSTRACT

A method of communicating electronic information via a display device having a matrix of movable tactile elements. The method includes displaying a representation of a file containing hypertext links on a first portion of the matrix, and displaying a list of the hypertext links on a second portion of the matrix. The representation may include graphical elements and text symbols such as Braille.

20 Claims, 2 Drawing Sheets

INTERNET BROWSER FACILITY AND METHOD FOR THE VISUALLY IMPAIRED

FIELD OF THE INVENTION

This invention relates to reading devices for the visual impaired, and to methods for displaying electronic files such as internet web pages.

BACKGROUND AND SUMMARY OF THE INVENTION

As the Internet has become an important communication tool, the visually impaired require display devices that permit Internet content such as web pages to be displayed. Electro-mechanical devices have served to translate text into a tactilely readable format such as the Braille character set, which employs a matrix of tactile elements for each character, symbol, or word, with each element either being a flat spot or a raised bump. The standard Braille character set uses an 8-dot matrix (2 columns of 4 dots), allowing adequate permutations, with the character matrices spaced apart on a surface to allow them to be distinguished.

To display graphic content, such as icons, symbols, a cursor, borders, arrows, drawings, and photo images, a tactile device requires that the tactile elements be evenly and closely spaced apart. Such devices have been proposed which use a matrix arranged on a standard Braille 1.5 mm dot pitch, so that Braille characters are displayed by leaving intervening columns and rows of dots blank or flat, and so that simple graphic images are displayed in a dot matrix fashion using all available tactile elements.

Other systems may be developed having a tactile element matrix with a finer resolution than the standard Braille dot spacing, with each dot generated by raising a cluster of tactile elements, and a number of inactive tactile elements between each adjacent Braille dot. This would permit a finer resolution for graphical purposes than provided for by the standard Braille dot pitch.

However, these systems are believed to be currently limited to the simple translation of electronic text (such as may be received in ASCII format) into strings of tactilely displayed Braille symbols. Since much of the content of a web page or other file may be in non-text form, this is not discernable to a visually impaired user of current Braille display devices. Current systems lack a means of identifying which words are selectable hypertext links to other web pages or downloadable content, nor do they provide a convenient means to locate such links on a page of text or to select and activate such links. Because the visually impaired user is unable to find these links "at a glance" in the manner of sighted users, he or she must serially read through the entire text to find a link of interest.

Web browsing often involves proceeding through several "layers" of pages at a web site to reach the page with the desired content. For a sighted person, this can be rapid; for the visually impaired, it can be time consuming to read up to the entire content of each page to find the desired link to the next page. This delay is exacerbated by the limited rate at which Braille text may be read.

The present invention overcomes the limitations of the prior art by providing a method of communicating electronic information via a display device having a matrix of movable tactile elements. The method includes displaying a representation of a file containing hypertext links on a first portion of the matrix, and displaying a list of the hypertext links on a second portion of the matrix. The representation may include graphical elements and text symbols such as Braille.

DETAILED DESCRIPTION OF A PREFERRED EMBODIMENT

Figure 1:
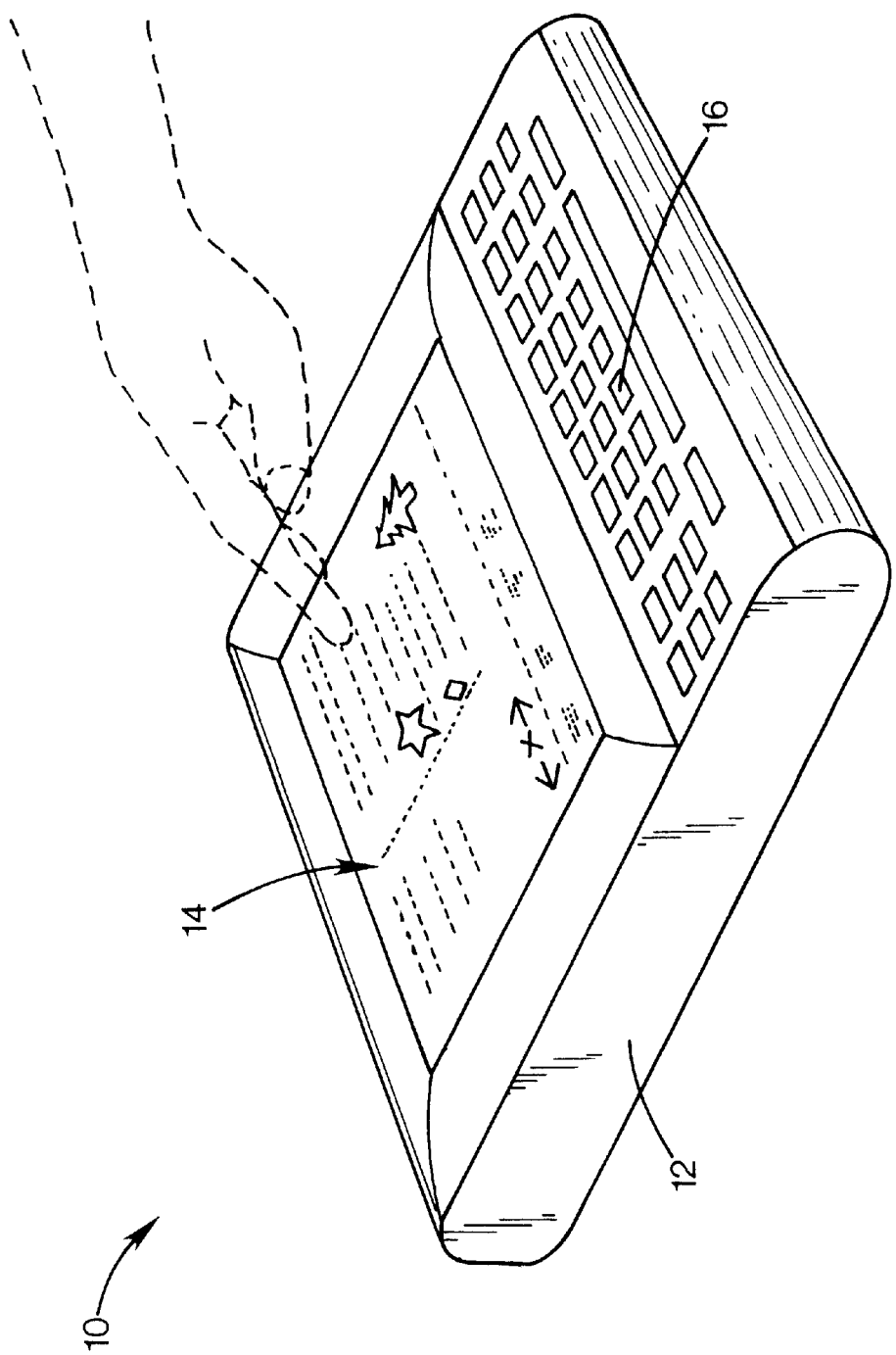
FIG. 1 is a perspective view of a tactile interface device according to a preferred embodiment of the invention.

FIG. 1 shows a portable computer device 10 having a housing 12 containing a display screen 14 and a keyboard 16. The device is intended for connection to a computer network such as the Internet via any means, including a hard-wired connection (not shown) for use with desktop applications, or a wireless communication link for portable usage. The device is intended to serve as hardware for browsing the world wide web, but may be used for other computer or entertainment tasks, including creating and reading documents.

Figure 2:
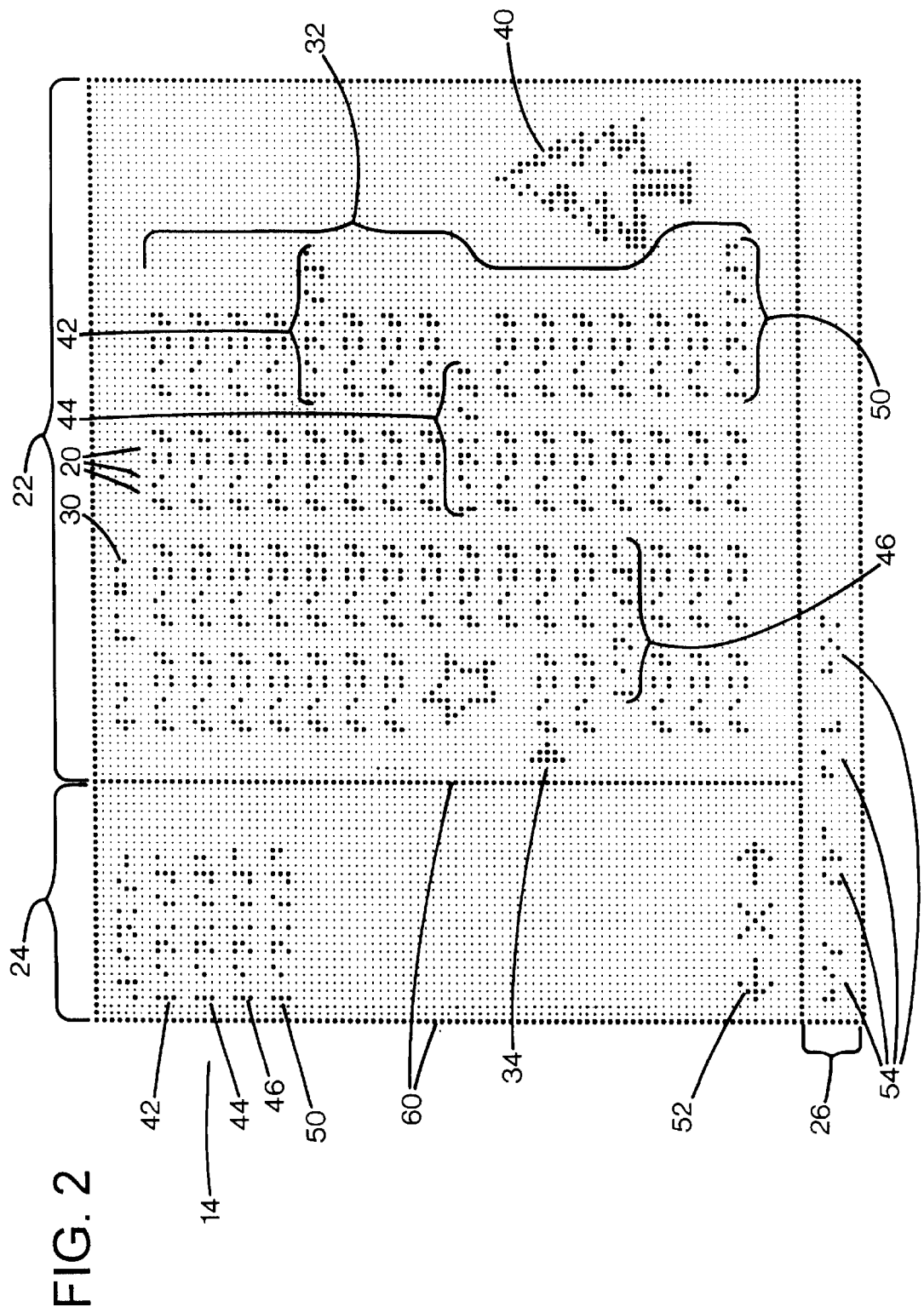
FIG. 2 is a sample tactile screen display of a device operated according to the embodiment of FIG. 1.

The screen 14 is a tactile feedback display capable of displaying the Braille character set in standard format, and includes a matrix of individually addressable dot or tactile elements 20, as shown in FIG. 2. The elements are arranged in an evenly spaced apart grid, so that each Braille character is spaced apart from an adjacent character by at least one blank row or column between the 2-dot by 4-dot individual character fields, unlike conventional Braille devices that do not provide active dots between character fields. The use of active dots at all points on the grid permits the entire display or any portion to be used for displaying graphic images.

Each tactile element 20 is switchable between an inactive position in which the dot is flush with the surrounding surface, and an active position in which the dot is raised above the surrounding surface, in the manner of a raised embossed dot on a Braille-imprinted paper document page. The mechanism for this may be of any type, including electro-mechanical actuators, electromagnetic elements, and switchable dimpled plastic film. The mechanism may be transparent, to permit a conventional visual flat panel display to be positioned behind the tactile screen, to aid sighted users including those assisting the visually impaired, as well as users with limited visual impairment that may be able to perceive some visual elements. Thus, a Braille word may be superimposed over the same word in conventional text. A graphical image such as an icon, a picture, a line, a cursor, or an arrow may underlay the raised dots corresponding to the image.

The display screen may also include a touch sensor operable to detect pressure from a user's finger on a particular part of the screen. The touch sensor may be a film behind a flexible tactile transducer film, or may be a thin film in front of the tactile elements, with sufficient flexibility and compliance that it dies not impair the tactile perception of the screen. The touch sensor may also be a film layer of the tactile surface itself, or may include touch sensitive elements interspersed adjacent the tactile dot elements so that neither the touch sensor nor tactile display elements overlay the other. Other touch screens may use grids of interruptible beams, capacitive discharge sensors, and conductive grids sensing a circuit made across nearby nodes. Similarly, the visual display may include picture elements in the form of switchable emitters or reflectors adjacent to each tactile element, aiding a partially sighted user to identify the locations on the screen where tactile readable elements are raised.

FIG. 2 shows a sample display screen in detail. The screen includes three main portions: A content frame 22, an index frame 24, and a button frame 26. The content frame displays a Braille-translated version of a web page or other document. All text from the original downloaded file is translated to Braille, and graphic images are selectively simplified and converted to a dot matrix image of suitable scale on the screen. A text title 30 identifies the web page contents; a text block 32 is displayed in Braille. A number of images and symbols are displayed in the content frame, including a cursor arrow or icon 34, a small line drawing 36 (showing a star shape in the example), and a larger image rendering 40 (showing a pine tree).

Like typical web page text content, the text block includes several hypertext links 42, 44, 46, 50, each corresponding to a different web address, and leading to a different web page. On conventional visually displayed web pages the links may be in text form, either listing the actual URL or web address, or including other words (e.g. "click here for more information"). Links may conventionally be tied to an icon, image, or region of the screen, which if clicked with a user's cursor will cause the web browsing software to connect to an associated site. However, with tactile displays, a detailed image is unlikely to convey to the user adequate information about the link. Therefore, the link is preferably indicated by a Braille text string identifying the link.

Because the links are often dispersed amongst the other words of text on the content frame, there is no way for the user relying on touch to quickly locate and identify the links. All the text must be read to ensure that all links are located. Therefore, the system software extracts all active links in the displayed page, and lists them in the index frame. In the illustrated example, the four links are listed in the order they are found in the text. The user may select other sort modes, such as segregating links by class (e.g. those pointing to other pages at the current site, to other sites, to commercial advertisements, and essential index links such as "search site", "contact us", "what's new", and the like, often found in a separate page frame or at the bottom of each page.

Using pressure- or presence-sensing transducers, the device may detect a user's finger hovering over a link, and offer additional information about the link before actually connecting to the associated site or page. This information may be provided by an audible voice synthesizer, or by creating a temporary Braille text box containing the descriptive text adjacent to the touched link, in the manner of a drop down menu used in a graphical user interface. The matrix tactile elements may be the pressure sensors, with the signal-to-motion transducers operating in reverse from the display function, such that a pressure generates a signal.

When a link is selected or clicked by application of a deliberate pressure, or by other input such as tapping the link with a given force profile or pattern (e.g. a double tap,) the system software retrieves the page associated with the clicked link, converts it to the tactile format, and displays it in the content frame by raising the appropriate tactile elements or dots. The system also extracts the hypertext link information from the retrieved page, and lists the included links in the index frame.

The index frame includes several symbols 52 corresponding to the common browsing commands of "back", "stop", and "forward." These may be used in the conventional manner, or may be used in a way more useful to visually impaired users to access a chronological history of pages visited, as opposed to the conventional approach that does not permit the back command to bring the user into a deeper level page reached via a parent page from which the user accesses a different deeper level page (i.e. the user may only back upward in the hierarchy to the first page visited.) The preferred embodiment permits the user to "back" in sequence through all pages visited, even if going "back" takes the user to a lower level, or in a conceptually retrograde direction.

The button frame 26 includes buttons 54 in the form of Braille text labels identifying their functions. Buttons may serve to select the type of information displayed in the index frame 24, such as "list", which indicates the current preferred status in which hyperlinks are listed; "search", which displays a search utility; "favorites", which lists bookmarked favorite web pages; "home", and "help", which have conventional usage. Other buttons may open features for controlling software settings, and operations such as printing and saving of files.

All frames are bordered and divided from each other by boxes or lines 60 formed by raised dots in straight single rows. These lines formed from the matrix of tactile elements permit the user to know which frame is being read, and to ensure that information in different frames is not confused.

While the above is discussed in terms of preferred and alternative embodiments, the invention is not intended to be so limited.

What is claimed is:

1. A method of communicating electronic information by tactile means comprising:

providing a display device having a matrix of moveable tactile elements;

displaying a tactile-readable translation of a first file containing hypertext links within the content of the first file and separate from a page number on a first portion of the matrix; and displaying a list of the hypertext links on a second portion of the matrix, whereby a user may select a second file associated with a first hypertext link from the displayed list of hypertext links.

2. The method of claim 1 wherein displaying a file includes downloading web content and converting it to a tactile-readable format.

3. The method of claim 2 wherein converting to a tactile readable format includes converting text characters to tactile symbols, and includes representing graphical image content by generating a corresponding pattern of raised tactile elements.

4. The method of claim 1 wherein displaying the list of links includes sorting the list.

5. The method of claim 1 including displaying in the first portion of the matrix a tactile-readable translation of the second file in response to selection of the first hypertext link by a user.

6. The method of claim 5 wherein displaying the second file occurs in response to sensing an applied force to at least a portion of a set of raised tactile elements corresponding to the first hypertext link.

7. The method of claim 5 including updating the first portion of the matrix with a list of links from the second file.

8. A tactile web browsing device comprising:

a display device having a matrix of movable tactile elements;

a first portion of the matrix operable to display a tactile-readable translation of a first file containing hypertext links within the content of the first file and separate from a page number; and a second portion of the matrix operable to display a list of the hypertext links, whereby a user may select a second file associated with a first hypertext link from the displayed list of hypertext links.

9. The device of claim 8 wherein the tactile elements are evenly spaced apart, such that graphical images are readily displayed.

10. The device of claim 8 including a touch sensor responsive to pressure on the matrix, and operable to identify the location of a pressure applied to the matrix.

11. The device of claim 8 including a converter that converts a web page to a tactile readable form.

12. The device of claim 8 including a link extractor that identifies links displayed in the first portion of the matrix, and for displaying the links in a list form in the second portion of the matrix.

13. A web browsing method comprising:

downloading a first file containing hypertext links within the content of the first file and separate from a page number;

generating a tactile-readable translation of the first file;

extracting a list of hypertext links contained in the first file; and generating a tactile-readable translation of the list, whereby a user may select a second file associated with a first hypertext link from the displayed list of hypertext links.

14. The method of claim 13 wherein generating a tactile-readable translation of the first file includes converting a text portion of the first file to a tactile character set.

15. The method of claim 13 wherein generating a tactile-readable translation of the first file includes converting a graphics image in the first file to a tactile pattern corresponding to the image.

16. The method of claim 13 wherein generating a tactile-readable translation of the list includes sorting the list.

17. The method of claim 13 including displaying in a first portion of a tactile display screen a tactile-readable translation of the second file in response to selection of the first hypertext link by a user.

18. The method of claim 17 wherein displaying the tactile-readable translation of the second file occurs in response to sensing an applied force to a tactile-readable translation of the first hypertext link.

19. The method of claim 17 including extracting hypertext links from the second file, and generating a tactile-readable translation of a list of the links extracted from the second file.

20. The method of claim 13 wherein generating a tactile-readable translation of the first file and of the list includes providing a display device having an evenly spaced matrix of movable tactile elements.

\* \* \* \* \*